July 18, 1944.  P. R. GOLDMAN  2,353,662
IMPLEMENTAL EQUIPMENT FOR LIFE RAFTS AND THE LIKE
Filed April 10, 1943  2 Sheets-Sheet 1
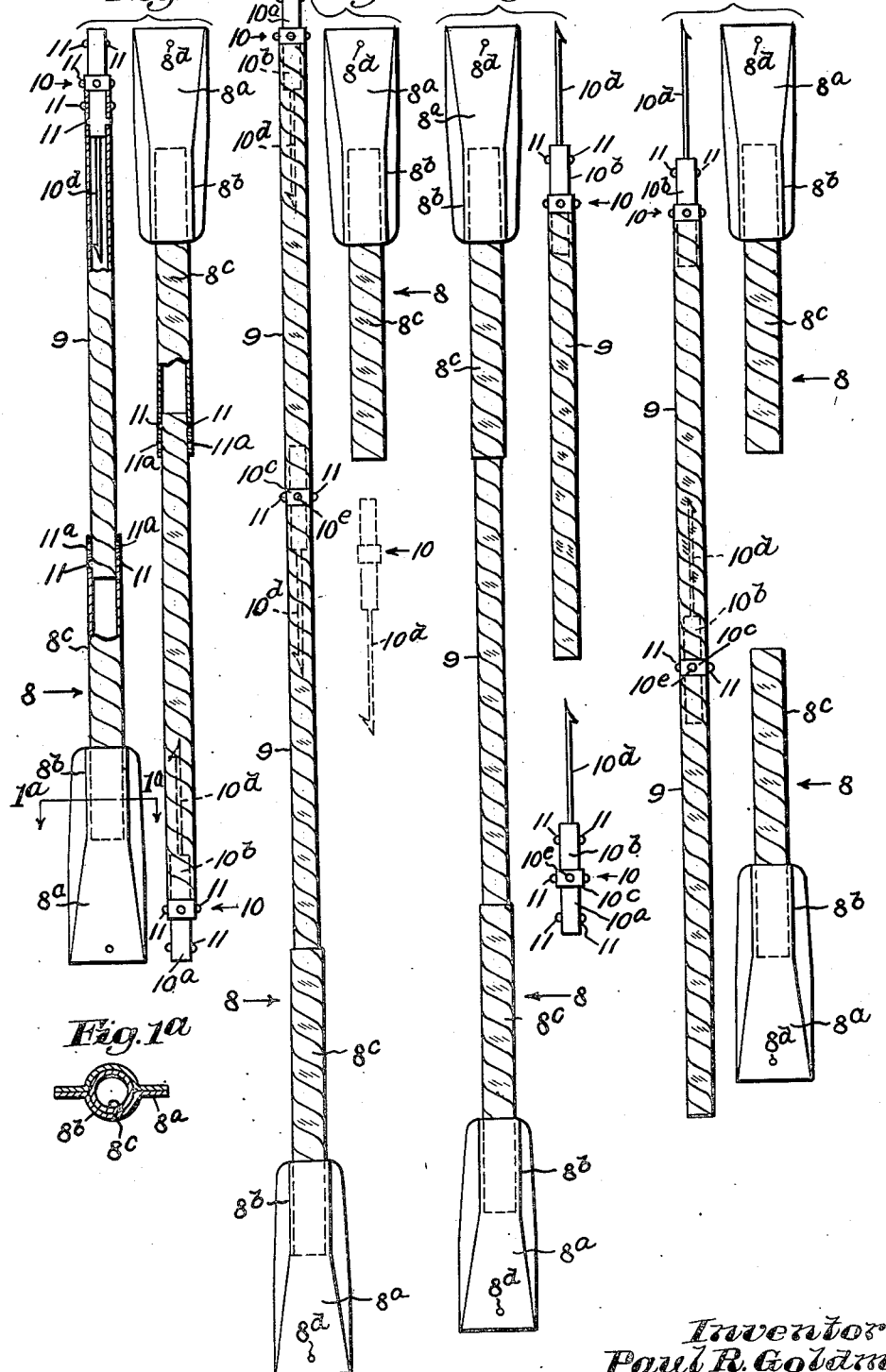
Inventor:
Paul R. Goldman
by Emery, Booth, Townsend, Miller & Weidner Attys July 18, 1944.   P. R. GOLDMAN   2,353,662
IMPLEMENTAL EQUIPMENT FOR LIFE RAFTS AND THE LIKE
Filed April 10, 1943   2 Sheets-Sheet 2
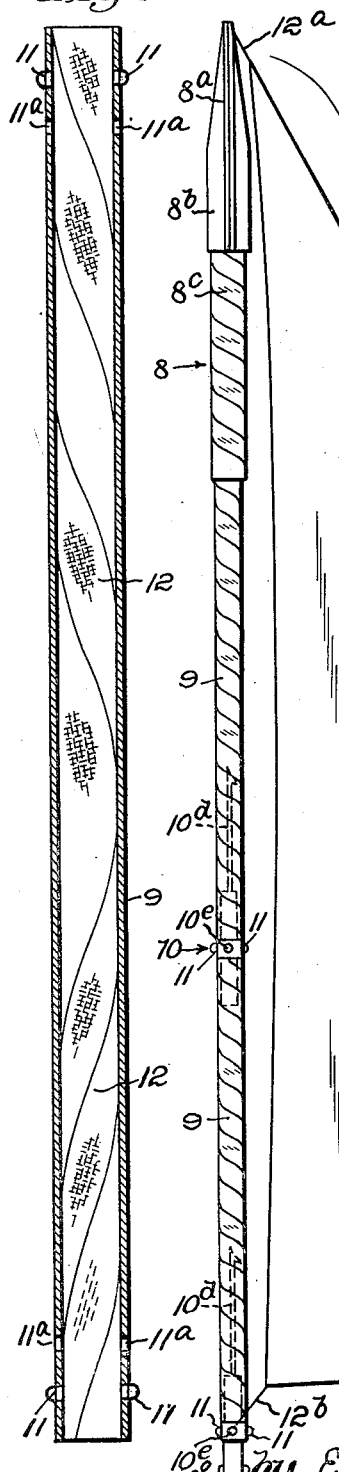
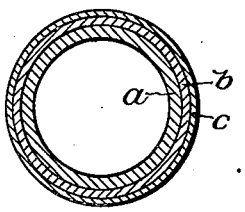
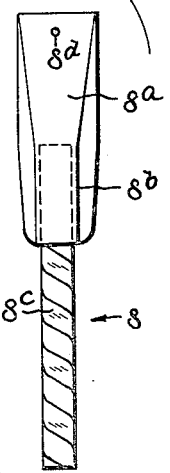
Inventor:
Paul R. Goldman
By Emery, Booth, Townsend, Miller & Weidner Attys Patented July 18, 1944

2,353,662

UNITED STATES PATENT OFFICE 2,353,662

IMPLEMENTAL EQUIPMENT FOR LIFE RAFTS AND THE LIKE

Paul R. Goldman, Andover, Mass., assignor to Plymold Corporation, Lawrence, Mass., a body corporate Application April 10, 1943, Serial No. 482,591

1 Claim. (Cl. 9—24)

My present invention relates to accessory equipment for life rafts, floats and the like, such as carried for personnel rescue purposes by ships and aircraft operating over water. It aims to provide for propelling and navigating such life rafts and floats and to aid subsistence on them, through compact rugged equipment constructed and arranged for various assembly for different uses and having a relatively light-weight buoyant structure particularly suitable for storage and transport aboard airplanes.

In the drawings illustrating by way of example one embodiment of the invention:

Fig. 1 shows a typical equipment set or assembly compactly and symmetrically arranged as a pair of similar oars;

Fig. 1a is an enlarged section on the line 1a—1a of Fig. 1;

Fig. 2 illustrates the same equipment disposed as a long-handled oar and a short-handled blade adapted to serve as a paddle or rudder;

Fig. 3 illustrates another assembly of the same equipment, in this instance as a double-bladed oar or paddle, together with two harpoon or spear devices;

Fig. 4 represents a still further assembly of the several elements of the equipment, in this case as a long-handled harpoon and two separate blade elements;

Fig. 5 again shows the same equipment set as arranged to provide a mast and sail, with separate steering means;

Fig. 6 is an enlarged longitudinal sectional view of one of the shaft sections or tubular elements adapted to pack a rolled sail such as that of Fig. 5;

Fig. 7 is a further enlarged typical cross-sectional view illustrating the laminate veneer or plywood construction of the tubular parts.

Referring first to Figs. 1 and 1a, the equipment set or assembly comprises a sectionalized structure the several elements of which are adapted to be interfitted in various different arrangements, in this instance as an oar pair. Each such oar includes three separable elements, namely a blade section indicated generally at 8, a shaft section 9 and a spear-head and adapter 10.

In accordance with the invention these three main elements, of which there are two each in the two-oar equipment set or unit as here illustrated, are fabricated of lamillar wood veneer or plywood wherein the constituent layers are bonded together by thermosetting or thermoplastic agents and are impregnated or otherwise treated to render them weather and waterproof.

The blade or paddle portion 8a of the section 8 is formed of a number of wood or veneer layers united flatwise at the lower portion and molded to provide a cylindrical socket 8b at the opposite end of the blade, into which one end of the tubular shafting 8c is set and preferably permanently secured under plastic bonding.

The several tubular elements including said shaft portion 8c of the blade section 8, the shaft or extension piece 9 and desirably also the body of the adapter or connector elements 10, are formed of wound veneer strip material. Their general tubular structure preferably is such as disclosed for example in my copending application Serial No. 467,243. As represented in the substantially full-scale but diagrammatic sectional view of Fig. 7, this tubing comprises a number of concentric layers such as a, b and c each in turn made up of a plurality of windings or wrappings of thin wood veneer, all plastically bonded together into a unitary tubular structure of great strength and rigidity both radially and axially.

As described in the application referred to, the inner or core stratum a, Fig. 7, includes a plurality of alternately oppositely wound veneer strips in which the predominant grain direction follows the line of the spiral winding. Over this is a longitudinal strengthening or rigidifying stratum b, itself composed of two or more plies of veneer applied by straight-on winding or otherwise so as to present the grain predominantly in parallelism with the tube axis. Over this is a covering and protective layer c, again made up of two or more windings of veneer strip material wrapped spirally in opposite directions in succeeding plies. As stated, this multi-ply triple-strata bonded veneer tubing provides the body structure for the several hollow cylindrical elements of the present invention.

The three main component sections 8, 9 and 10 of the equipment are adapted to be detachably intersecured endwise, in various different arrangements and combinations, as by interfitting or telescoping attachment at their respective ends. As here shown the handle 8c of the blade section 8 is of sufficiently larger internal diameter at least at its end to provide a socket for receiving either end of the extension piece or shaft 9, the latter being of appropriately smaller external end diameter, or having reduced end portions for the purpose. While within the invention either of the elements may be proportioned for fitting on or into the other, the construction illustrated makes for reduced weight and material, in that the longer elements are of relatively smaller diameter.

The adapter elements 10, preferably and herein two to each equipment set, serve a variety of purposes. As arranged in Fig. 1, they constitute closure caps, plugs or grip extensions for the respective oars of the pair. Each comprises opposed plug-like portions 10a, 10b of a diameter to fit into the shafts 9, with an intermediate collar or annular enlargement 10c of an external diameter conforming to the internal diameter of the blade handles 8c, for seating reception therein. One of the plug portions such as 10a desirably is closed at its outer end. The opposite plug portion 10b serves as an adapter or attaching base for a sharp barbed or hook-like metal point or spear-head 10d.

These spearing, jabbing or hooking members are adapted to be housed at the otherwise open end of the respective tubular extensions or shaft sections 9, the tubular or cylindrical spear-mounting base portion 10b being of an outer diameter for tight seating in either end of either shaft section. One or the other or both shaft sections of the illustrated equipment unit serve also for housing storage of a sail such as seen in Fig. 5, and which is represented in its wrapped and stored condition in Fig. 6. As best seen on the larger scale of Fig. 6, spring detents, catches, snap buttons or the like releasable fasteners as represented at 11, 11 desirably are provided, preferably in opposed pairs, herein on the sections 9 for locking reception in corresponding apertures 11a, 11a in the blade handles 8c, and on both ends 10a and 10b and the central portion 10c of the connector and adapter elements 10, for similar reception respectively in corresponding apertures at the ends of the shaft sections and said apertures of the blade handles. The interfitted parts are thus held against accidental separation.

Figs. 2 to 5 represent by way of example a number of the different assemblies of the component parts of the equipment set such as that of Fig. 1, illustrating the structural inter-relation of the several elements of the equipment unit as a whole.

Noting Fig. 2, the two detachable handle extensions or shaft sections 9 are there joined in line to present a long-handled oar, paddle or sweep as seen at the left in said figure. For thus joining together end to end the two shaft sections 9, one of the elements 10 is utilized as a connector or union, its two opposed plug portions being inserted into the adjacent ends of said shafting and affording a rigid joint between them. The other cap, connector and spear-carrying element 10 may be installed at the end of the shaft section 9 remote from the blade, either with the spearhead sheathed as illustrated or with the spear head projecting, in which latter case the resulting composite device is available optionally as a long-shafted harpoon or as a propelling means. In the combination of Fig. 2 the other blade member 8 is separately available as a paddle or the like, or if preferred the spear-carrying connector element 10 shown at the outer end of the long-handled oar may be installed at the end of the relatively short shaft 8c of said separate blade member 8, with the spear-head either sheathed or exposed.

Another combinational arrangement of the sectional equipment set may be such as represented in Fig. 3. Here the respective blade members 8 are interfitted at the opposite ends of one of the shaft sections 9, thus providing a double-bladed paddle. One or both of the spear-carrying connectors 10 may be installed endwise upon the other shaft section 9, either in sheathed or exposed condition. As seen in Fig. 3 by way of example, one of said elements 10 is set with its spear head projecting, thus forming a relatively short-handled harpoon or prod, the remaining element 10 being available for manual use as may be desired.

Still another manner of assembly is that as represented in Fig. 4. In this instance the two handle extension members or shafts 9 are interconnected by means of one of the elements 10, similarly as for the long-handled oar of Fig. 2. The other element 10 is set into one end of the plural-section shafting thus formed, thereby providing a long-handled harpoon or spear. The pair of blade sections 8 are then individually available for use as paddles, clubs or otherwise.

Fig. 5 shows the several elements of the equipment unit disposed to present a sail-carrying mast and a rudder. Here again the two shaft sections 9 are inter-connected end to end as by means of one of the connector elements 10. At the then upper end of the long plural-section shaft is secured one of the blade sections 8, while at the opposite end the other element 10 is inserted with its spear-head sheathed, its projecting portion 10a providing a base for the resulting mast whereby it may be stepped into any suitable socket or receiving formation available on the raft or float. The sail 12 having been removed from its housing shaft (see Fig. 6) is unfurled and secured to the mast in any desired manner, such as the leg o' mutton rig seen in Fig. 5. It desirably is formed of a strong light-weight fabric and may be equipped with suitable cords for attaching purposes, as at its respective corner portions at 12a, 12b and 12c. To facilitate rigging the sail the oar blades 8a desirably each have an aperture 8d near their outer ends, and the collar or ferrule portions 10c of the elements 10 also may be apertured for the purpose, as indicated at 10e. In the combination and arrangement of Fig. 5 the second blade element 8 of the set is available as a rudder.

My invention is not limited to the particular embodiment thereof illustrated and described herein, and I set forth its scope in my following claim.

I claim:

A life raft accessory unit comprising, in combination, an assembly set including, a pair of similar separable shaft elements each formed of a concentric series of wood veneer strips wound and bonded together into a hollow tubular formation, a blade section comprising a plywood blade having a longitudinally projecting tubular handle open at the end distal from the blade, said tubular handle having a telescoping fit with one of said shaft elements, and a cylindrical closure-connector section having opposed plug-like ends of which one is formed as a base for a spear head, said closure-connector section being inserted into adjacent ends of said shaft elements and affording a rigid joint between them, the outer end of the other shaft element being adapted to receive a second closure-connector section or a second blade section, said elements and sections being interchangeably interconnectable in line with other like sections to present, alternatively, two relatively short paddles, a relatively long and a relatively short paddle, a double ended paddle and a relatively short spearing implement, a relatively long spearing implement and a pair of relatively short paddles, or a mast and a relatively short rudder-paddle.

PAUL R. GOLDMAN.